United States Patent
Odaka

(10) Patent No.: US 11,079,017 B2
(45) Date of Patent: Aug. 3, 2021

(54) HYDRAULIC CYLINDER

(71) Applicant: SMC CORPORATION, Chiyoda-ku (JP)

(72) Inventor: Tsukasa Odaka, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/611,743

(22) PCT Filed: Feb. 26, 2018

(86) PCT No.: PCT/JP2018/006846
§ 371 (c)(1),
(2) Date: Nov. 7, 2019

(87) PCT Pub. No.: WO2018/207429
PCT Pub. Date: Nov. 15, 2018

(65) Prior Publication Data
US 2020/0109782 A1   Apr. 9, 2020

(30) Foreign Application Priority Data

May 8, 2017 (JP) .............................. JP2017-092220

(51) Int. Cl.
*F16J 9/12* (2006.01)
*F16J 7/00* (2006.01)

(52) U.S. Cl.
CPC .. *F16J 9/12* (2013.01); *F16J 7/00* (2013.01)

(58) Field of Classification Search
CPC ...... F16J 7/00; F16J 9/12; F15B 15/14; F15B 15/1447; F15B 15/1428
See application file for complete search history.

(56) References Cited

U.S. PATENT DOCUMENTS

| 6,129,003 A | 10/2000 | Udagawa |
| 10,570,934 B2 | 2/2020 | Kudo et al. |
| 10,677,270 B2 * | 6/2020 | Suzuki ................ F15B 15/2861 |

(Continued)

FOREIGN PATENT DOCUMENTS

| CN | 1212337 A | 3/1999 |
| JP | 2001-234903 | 8/2001 |

(Continued)

OTHER PUBLICATIONS

International Search Report dated May 22, 2018 in PCT/JP2018/006846 filed Feb. 26, 2018.

(Continued)

*Primary Examiner* — Abiy Teka
(74) *Attorney, Agent, or Firm* — Oblon, McClelland, Maier & Neustadt, L.L.P.

(57) ABSTRACT

A hydraulic cylinder (10) comprises a cylinder tube (12) having a circular slide hole (13), a piston unit (18), and a piston rod (20). The piston unit (18) has a circular piston body (40), packing (42) that is installed on the outer circumferential portion of the piston body (40), a movable member (44) that is mounted to the outer circumferential portion of the piston body (40) so as to be able to rotate relative to the piston body (40), and a magnet (46) that is held by a magnet holding unit (58) of the movable member (44). Relative rotation of the movable member (44) with respect to the cylinder tube (12) is regulated.

5 Claims, 7 Drawing Sheets

(56) References Cited

U.S. PATENT DOCUMENTS

2008/0173169 A1    7/2008  Ikari
2018/0135662 A1    5/2018  Suzuki et al.

FOREIGN PATENT DOCUMENTS

JP      2008-133920 A      6/2008
JP        2017-3023 A      1/2017
WO    WO 2016/052126 A1    4/2016

OTHER PUBLICATIONS

Combined Chinese Office Action and Search Report dated Aug. 27, 2020 in Chinese Patent Application No. 201880030740.6 (with English translation and English translation of Category of Cited Documents), 14 pages.

Office Action dated Jan. 27, 2021 in India Patent Application No. 201947050110; 5 pgs.

\* cited by examiner

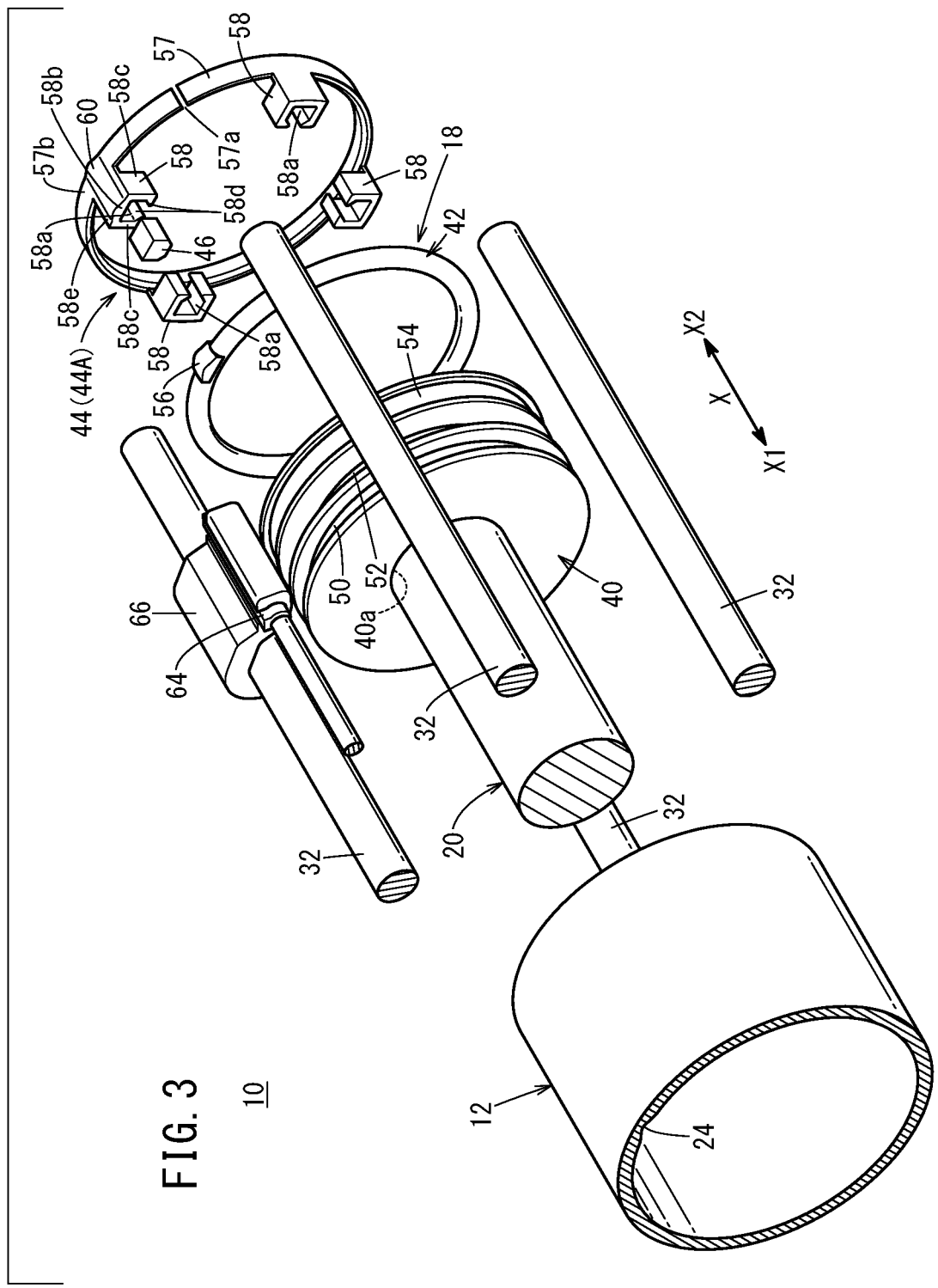

HYDRAULIC CYLINDER

TECHNICAL FIELD

The present invention relates to a fluid pressure cylinder (hydraulic cylinder) including a piston on which a magnet is disposed.

BACKGROUND ART

For example, fluid pressure cylinders including pistons displaced according to supply of pressurized fluid are well known as means for transporting workpieces and the like (actuators). A typical fluid pressure cylinder includes a cylinder tube, a piston disposed inside the cylinder tube to be movable in the axial directions, and a piston rod connected with the piston.

To detect the position of a piston, a fluid pressure cylinder disclosed in Japanese Laid-Open Patent Publication No. 2008-133920 includes a ring-shaped magnet attached to an outer circumferential part of the piston, and a magnetic sensor disposed outside a cylinder tube. In this structure, the magnet has a ring shape (extends around the entire circumference) while the magnetic sensor is disposed on the cylinder tube only at a point in the circumferential direction. That is, the magnet is larger than necessary to detect the position of the piston. On the other hand, a fluid pressure cylinder disclosed in Japanese Laid-Open Patent Publication No. 2017-003023 includes magnets (non-ring-shaped magnets) held in an outer circumferential part of a piston only at certain points in the circumferential direction.

SUMMARY OF INVENTION

In the fluid pressure cylinder disclosed in Japanese Laid-Open Patent Publication No. 2017-003023, the distances between magnetic sensors and the magnets (positional relationships in the circumferential direction) are constant at all times. Thus, the magnetic force exerted on the magnetic sensors secured at fixed positions (positional relationships between the magnetic sensors and the magnets in the circumferential direction) cannot be adjusted.

On the other hand, a magnetic sensor can be attached to an outer circumferential part of a circular cylinder tube using a sensor mounting band. In this structure, the magnetic sensor can be disposed at a freely selected position on the outer circumferential part of the cylinder tube and thus can be attached after the distance between the magnetic sensor and the non-ring-shaped magnet is adjusted. However, when the piston rod is rotated after the magnetic sensor is attached to the outer circumferential part of the cylinder tube, the distance between the magnetic sensor and the non-ring-shaped magnet is disadvantageously changed.

Moreover, when the piston rod is rotated in the structure where the magnetic sensors are attached at fixed positions outside the cylinder tube, the distances between the magnetic sensors and the non-ring-shaped magnets are disadvantageously changed.

The present invention has the object of providing a fluid pressure cylinder capable of solving at least one of the aforementioned problems with the known technologies.

To achieve the above-described object, a fluid pressure cylinder of the present invention comprises a cylinder tube including a slide hole with a circular shape inside the cylinder tube, a piston unit disposed to be reciprocable along the slide hole, and a piston rod protruding from the piston unit in an axial direction, wherein the piston unit includes a piston body with a circular shape protruding radially outward from the piston rod, a packing attached to an outer circumferential part of the piston body and brought into slidably contact with an inner circumferential surface of the cylinder tube, a movable member including a magnet holding portion and attached to the outer circumferential part of the piston body to be rotatable relative to the piston body, and a magnet held by the magnet holding portion and disposed in the piston body partially in a circumferential direction of the piston body, wherein the piston rod is rotatable relative to the cylinder tube, and wherein rotation of the movable member relative to the cylinder tube is restricted.

According to the fluid pressure cylinder with the above-described structure, the magnet is disposed only at a required point in the circumferential direction. Thus, the cost and the weight of the product can be reduced. When the cylinder tube is rotated in a structure where a magnetic sensor is attached at a fixed position outside the cylinder tube and the circumferential position of the cylinder tube can be adjusted, the magnet held by the movable member disposed inside the cylinder tube also rotates in an integrated manner. Thus, the magnetic force exerted on the magnetic sensor can be easily adjusted by adjusting the distance between the magnetic sensor disposed outside the cylinder tube and the magnet (positional relationship between the magnetic sensor and the magnet in the circumferential direction). Consequently, the fluid pressure cylinder can support various types of magnetic sensors with different sensitivities, in the use of one type of cylinder structure. This efficient use of parts leads to a reduction in the product cost.

On the other hand, in a structure where the magnetic sensor is attached to an outer circumferential part of the cylinder tube at a freely selected position using a sensor mounting band, the distance between the magnetic sensor and the magnet is unchanged even when the piston rod is rotated after the magnetic sensor is attached to the outer circumferential part of the cylinder tube. Moreover, in a structure where the magnetic sensor is attached at a fixed position outside the cylinder tube, the distance between the magnetic sensor and the magnet is unchanged even when the piston rod is rotated. This conveniently allows the piston rod to be rotated without changing the distance between the magnetic sensor and the magnet when, for example, the fluid pressure cylinder is installed in equipment.

It is preferable that the movable member be a wear ring configured to prevent the piston body from coming into contact with the cylinder tube.

According to the structure, the movable member serves both as a member holding the magnet and the wear ring, leading to a reduction in the number of parts. This efficient use of parts leads to a further reduction in the product cost.

It is preferable that a magnet arrangement groove with an annular shape be formed in the outer circumferential part of the piston body and that the magnet holding portion be fitted in the magnet arrangement groove.

In a case where the attachment position of the magnetic sensor in the fluid pressure cylinder cannot be determined in advance, a ring-shaped magnet will be used. According to the above-described structure, the piston body can be used for both when a non-ring-shaped magnet is used (present invention) and when a ring-shaped magnet is used. This efficient use of parts leads to a reduction in the product cost.

It is preferable that a detent groove be provided in the inner circumferential surface of the cylinder tube in an axial direction of the cylinder tube and that the movable member be provided with a detent protrusion fitted in the detent groove.

This simple structure allows the rotation of the movable member and the cylinder tube relative to each other to be restricted.

It is preferable that the movable member include a circumferential portion extending in the circumferential direction along the outer circumferential part of the piston body, that the magnet holding portion protrude from the circumferential portion in the axial direction, and that the detent protrusion be provided across an outer surface of the circumferential portion and an outer surface of the magnet holding portion.

According to the structure, the axial length of the detent protrusion required to restrict the rotation of the movable member and the cylinder tube relative to each other in a preferred manner can be easily obtained.

It is preferable that a projection inserted in the detent groove to be in slidably contact with an inner surface of the detent groove be disposed on an outer circumferential part of the packing.

According to the structure, sealing performance at the area of the detent groove can be satisfactorily enhanced.

It is preferable that the magnet holding portion have a magnet receiving groove in which the magnet is fitted and that the magnet receiving groove pass through the magnet holding portion in the axial direction and be open radially inward.

According to the structure, the magnet can be easily attached to the magnet holding portion during assembly.

According to the fluid pressure cylinder of the present invention, the distance between the magnetic sensor and the magnet can be adjusted while the weight of the product is reduced. Alternatively, according to the fluid pressure cylinder of the present invention, the piston rod can be rotated without affecting the distance between the magnetic sensor and the magnet.

The above-described object, features, and advantages will become more apparent from the following description of preferred embodiments in conjunction with the accompanying drawings.

BRIEF DESCRIPTION OF DRAWINGS

FIG. 3 is an exploded perspective view of the fluid pressure cylinder illustrated in FIG. 1;

DESCRIPTION OF EMBODIMENTS

Preferred embodiments of a fluid pressure cylinder according to the present invention will be described in detail below with reference to the accompanying drawings.

Figure 1:
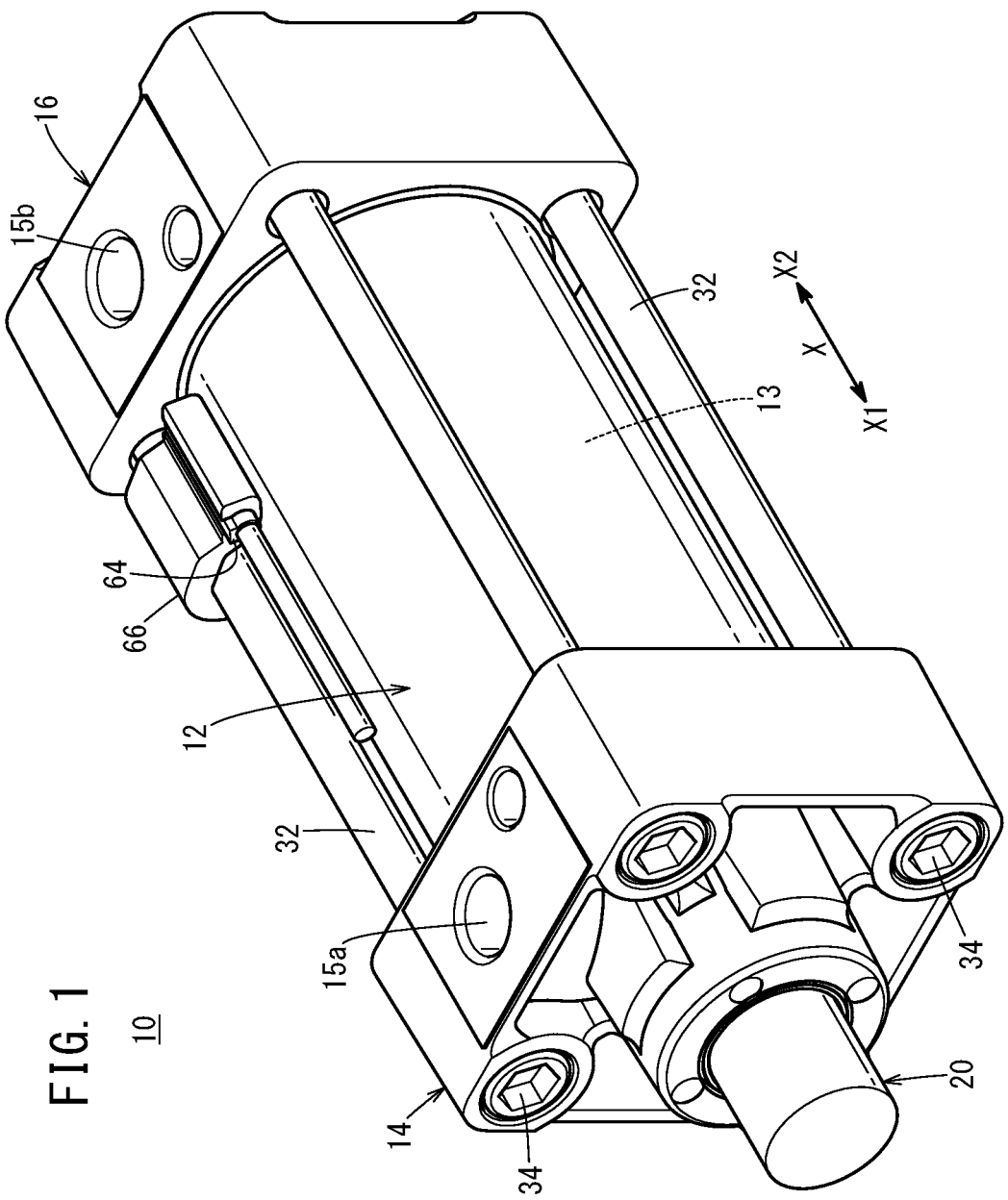
FIG. 1 is a perspective view of a fluid pressure cylinder according to a first embodiment of the present invention.
Figure 2:
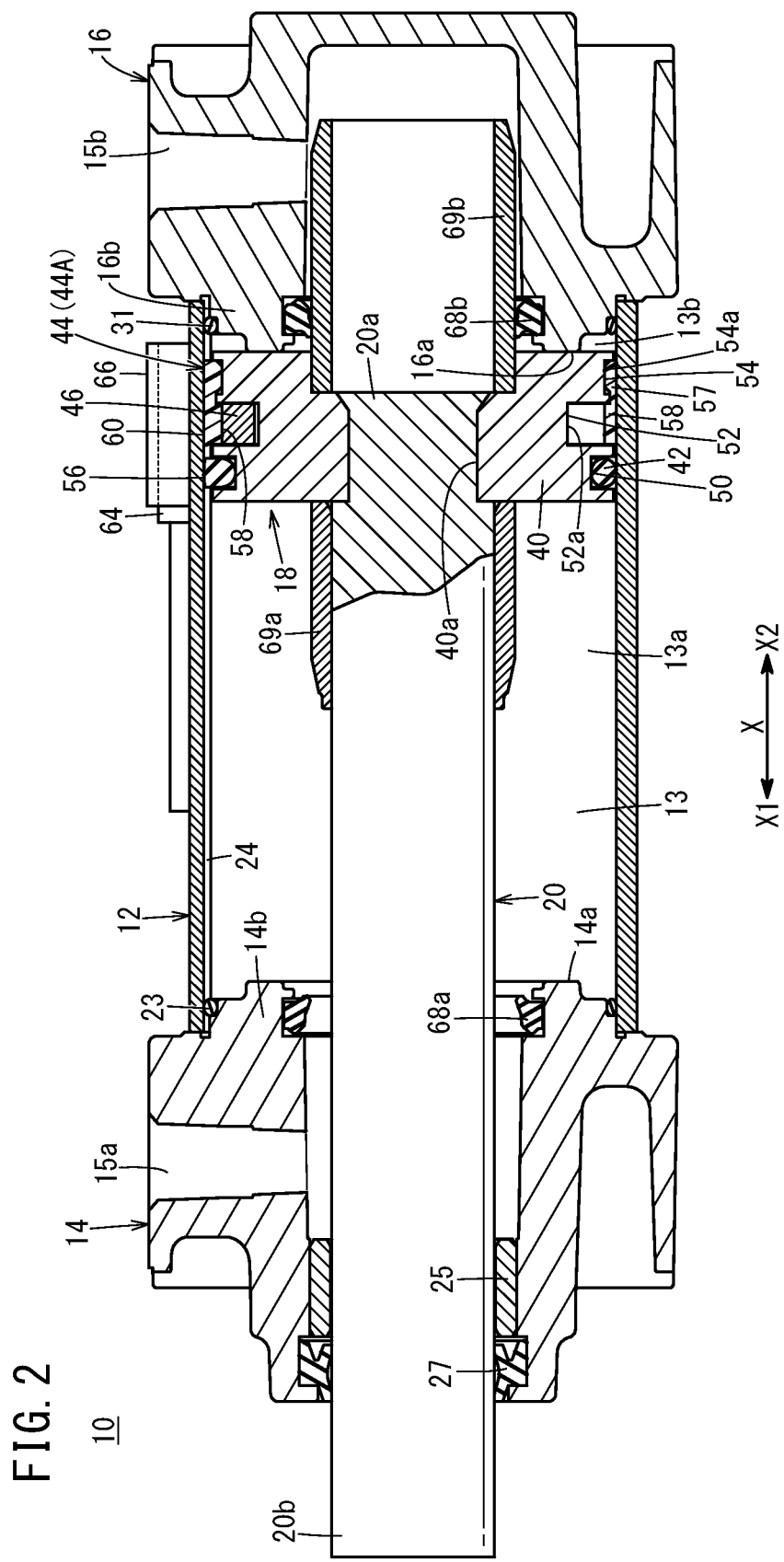
FIG. 2 is a cross-sectional view of the fluid pressure cylinder illustrated in FIG. 1.

A fluid pressure cylinder 10 according to a first embodiment illustrated in FIG. 1 includes a hollow tubular cylinder tube 12 having a circular slide hole 13 (cylindrical chamber) inside the cylinder tube 12, a rod cover 14 disposed at one end part of the cylinder tube 12, and a head cover 16 disposed at another end part of the cylinder tube 12. As illustrated in FIGS. 2 and 3, the fluid pressure cylinder 10 further includes a piston unit 18 disposed inside the cylinder tube 12 to be movable in the axial directions (X directions) and a piston rod 20 connected with the piston unit 18. The fluid pressure cylinder 10 is used as an actuator for, for example, transporting a workpiece.

The cylinder tube 12 is a tubular body composed of, for example, a metal material such as aluminum alloy and extends in the axial direction. In the first embodiment, the cylinder tube 12 has a hollow cylindrical shape.

A detent groove 24 extends in the inner circumferential surface of the cylinder tube 12 in the axial direction of the cylinder tube 12. The detent groove 24 is tapered (into a trapezoidal shape or a triangular shape) such that the width (circumferential width) thereof decreases radially outward. The detent groove 24 may have other polygonal shapes (for example, rectangular shape). In the first embodiment, the detent groove 24 is formed in the inner circumferential surface of the cylinder tube 12 at one point in the circumferential direction. Note that a plurality of (for example, three) detent grooves 24 may be formed in the inner circumferential surface of the cylinder tube 12 at intervals in the circumferential direction.

As illustrated in FIGS. 1 and 2, the rod cover 14 is provided to block up the one end part (an end part on a side at which an arrow X1 is pointing) of the cylinder tube 12, and is composed of, for example, a metal material similar to the material of the cylinder tube 12. The rod cover 14 has a first port 15*a*. As illustrated in FIG. 2, an annular protruding portion 14*b* provided for the rod cover 14 is fitted in the one end part of the cylinder tube 12.

A packing 23 with a circular ring shape is disposed between the rod cover 14 and the cylinder tube 12. A bush 25 with a circular ring shape and a packing 27 with a circular ring shape are disposed in an inner circumferential part of the rod cover 14. A first cushion packing 68*a* with a circular ring shape is disposed in the inner circumferential part of the rod cover 14.

The head cover 16 is composed of, for example, a metal material similar to the material of the cylinder tube 12 and is provided to block up the other end part (an end part on a side at which an arrow X2 is pointing) of the cylinder tube 12. The head cover 16 airtightly closes the other end part of the cylinder tube 12. The head cover 16 has a second port 15*b*.

An annular protruding portion 16*b* provided for the head cover 16 is fitted in the other end part of the cylinder tube 12. A packing 31 with a circular ring shape is disposed between the head cover 16 and the cylinder tube 12. A second cushion packing 68*b* with a circular ring shape is disposed in an inner circumferential part of the head cover 16.

As illustrated in FIG. 1, the cylinder tube 12, the rod cover 14, and the head cover 16 are fastened to each other in the axial direction by a plurality of connecting rods 32 and nuts 34. The plurality of pairs of connecting rods 32 and nuts 34 are disposed at intervals in the circumferential direction. Thus, the cylinder tube 12 is secured while being held between the head cover 16 and the rod cover 14.

As illustrated in FIG. 2, the piston unit 18 is accommodated inside the cylinder tube 12 (slide hole 13) to be slidable in the axial directions and partitions the slide hole 13 into a first pressure chamber 13a adjacent to the first port 15a and a second pressure chamber 13b adjacent to the second port 15b. In this embodiment, the piston unit 18 is connected with a base end portion 20a of the piston rod 20.

The piston unit 18 includes a circular piston body 40 protruding radially outward from the piston rod 20, a packing 42 with a circular ring shape attached to an outer circumferential part of the piston body 40, a movable member 44 attached to the outer circumferential part of the piston body 40 to be rotatable relative to the piston body 40, and a magnet 46 disposed in the piston body 40 partially in the circumferential direction of the piston body 40.

The piston body 40 has a through-hole 40a passing therethrough in the axial direction. The base end portion 20a (small diameter portion) of the piston rod 20 is fitted in the through-hole 40a of the piston body 40 and secured (connected) to the piston body 40 by swaging. The piston body 40 and the piston rod 20 may be secured to each other by screwing instead of swaging.

A packing receiving groove 50, a magnet arrangement groove 52, and a wear ring receiving groove 54 are formed in the outer circumferential part of the piston body 40 at different axial positions. The magnet arrangement groove 52 is disposed between the packing receiving groove 50 and the wear ring receiving groove 54. The packing receiving groove 50, the magnet arrangement groove 52, and the wear ring receiving groove 54 each have a circular ring shape extending around the entire circumference in the circumferential direction.

A bottom 52a of the magnet arrangement groove 52 is located radially inward of a bottom 54a of the wear ring receiving groove 54. Thus, the groove depth of the magnet arrangement groove 52 is greater than the groove depth of the wear ring receiving groove 54. The constituent material of the piston body 40 includes, for example, metal materials such as carbon steel, stainless steel, and aluminum alloy and hard resin.

The packing 42 is a ring-shaped seal member (for example, O-ring) composed of an elastic material such as rubber or elastomer. The packing 42 is fitted in the packing receiving groove 50.

The packing 42 is in slidably contact with the inner circumferential surface of the cylinder tube 12. Specifically, an outer circumferential part of the packing 42 airtightly or liquid-tightly adheres to the inner circumferential surface of the slide hole 13 around the entire circumference. An inner circumferential part of the packing 42 airtightly or liquid-tightly adheres to the outer circumferential surface of the piston body 40 around the entire circumference. The packing 42 seals a gap between the outer circumferential surface of the piston unit 18 and the inner circumferential surface of the slide hole 13 to airtightly or liquid-tightly separate the first pressure chamber 13a and the second pressure chamber 13b from each other inside the slide hole 13.

As illustrated in FIG. 3, a projection 56 inserted into the detent groove 24 to be in slidably contact with the inner surface of the detent groove 24 is disposed on the outer circumferential part of the packing 42. The projection 56 has a polygonal shape similar to the shape of the detent groove 24. That is, the projection 56 is tapered (into a trapezoidal shape or a triangular shape) such that the width (circumferential width) thereof decreases radially outward. The projection 56 airtightly or liquid-tightly adheres to the detent groove 24.

The engagement of the projection 56 with the detent groove 24 restricts the rotation of the packing 42 relative to the cylinder tube 12. Since the piston body 40 and the piston rod 20 are connected to be non-rotatable relative to each other, the piston body 40 rotates together with the piston rod 20 when the piston rod 20 is rotated. At this moment, the piston body 40 is rotatable relative to the packing 42.

In a case where a plurality of detent grooves 24 are formed in the inner circumferential surface of the cylinder tube 12 at intervals in the circumferential direction, a plurality of (same number as the detent grooves 24 or less) projections 56 may be disposed on the packing 42 at intervals in the circumferential direction.

The movable member 44 includes a circumferential portion 57 extending in the circumferential direction along the outer circumferential part of the piston body 40 and the magnet holding portions 58 protruding from the circumferential portion 57 in the axial direction. The plurality (four in the figure) of magnet holding portions 58 are disposed at intervals in the circumferential direction. The number of magnet holding portions 58 may be one.

The magnet holding portions 58 are fitted in the magnet arrangement groove 52. The magnet holding portions 58 each have a magnet receiving groove 58a in which the magnet 46 can be fitted. Each of the magnet receiving grooves 58a passes through the corresponding magnet holding portion 58 in the axial direction and is open radially inward. More specifically, the magnet holding portions 58 each include a base 58b protruding from the circumferential portion 57 in the axial direction and a pair of holding arms 58c extending radially inward from either side of the base 58b in the circumferential direction. The pair of holding arms 58c extend to face each other and each include a hook 58d protruding toward the opposing pair. The magnet receiving grooves 58a are formed between the pairs of holding arms 58c.

In the first embodiment, the movable member 44 is a wear ring 44A configured to prevent the piston body 40 from coming into contact with the cylinder tube 12, and is fitted in the wear ring receiving groove 54. The wear ring 44A prevents the outer circumferential surface of the piston body 40 from coming into contact with the inner circumferential surface of the slide hole 13 when a large lateral load is applied to the piston unit 18 in a direction perpendicular to the axial direction while the fluid pressure cylinder 10 is in operation. The outer diameter of the wear ring 44A is larger than the outer diameter of the piston body 40.

The wear ring 44A is composed of a low friction material. The friction coefficient between the wear ring 44A and the inner circumferential surface of the slide hole 13 is smaller than the friction coefficient between the packing 42 and the inner circumferential surface of the slide hole 13. Such a low friction material includes, for example, synthetic resins with a low friction property but a high resistance to wear such as polytetrafluoroethylene (PTFE) and metal materials (for example, bearing steel).

The circumferential portion 57 is fitted in the wear ring receiving groove 54. The circumferential portion 57 has a circular ring shape with a slit 57a (gap) left at a point in the circumferential direction. The slit 57a is left at a position offset from the magnet holding portions 58 in the circumferential direction. Specifically, the slit 57a is left between two magnet holding portions 58 adjacent to each other in the circumferential direction. During assembly, the movable member 44 is forcibly expanded in radial directions and is disposed around the wear ring receiving groove 54. The movable member 44 is fitted in the wear ring receiving groove 54 as the diameter of the movable member 44 shrinks by the elastic restoring force.

The rotation of the movable member 44 relative to the cylinder tube 12 is restricted. Specifically, in the first embodiment, the detent groove 24 is formed in the inner circumferential surface of the cylinder tube 12 in the axial direction of the cylinder tube 12, and a detent protrusion 60 engaging with the detent groove 24 is provided for the movable member 44. The detent protrusion 60 is slidable in the detent groove 24 in the axial directions.

Figure 4A:
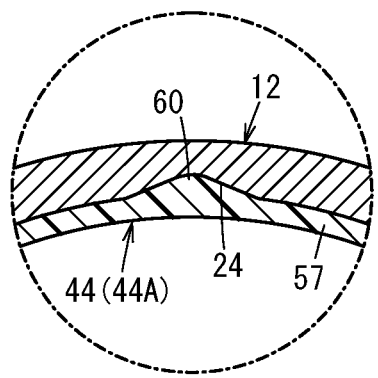
FIG. 4A is a cross-sectional view illustrating a structure (with a polygonal shape) restricting the rotation of a movable member relative to a cylinder tube.

The detent protrusion 60 protrudes radially outward from an outer circumferential part of the movable member 44. As illustrated in FIG. 4A, the detent protrusion 60 has a polygonal shape similar to the shape of the detent groove 24. That is, the detent protrusion 60 is tapered (into a trapezoidal shape or a triangular shape) such that the width (circumferential width) thereof decreases radially outward. In a case where a plurality of detent grooves 24 are formed in the inner circumferential surface of the cylinder tube 12 at intervals in the circumferential direction, a plurality of (same number as the detent grooves 24 or less) detent protrusions 60 may be disposed on the movable member 44 at intervals in the circumferential direction.

The detent protrusion 60 extends on an outer surface 57b of the circumferential portion 57 and an outer surface 58e of the corresponding magnet holding portion 58 in the axial direction. That is, the detent protrusion 60 extends across both the outer surface 57b of the circumferential portion 57 and the outer surface 58e of the corresponding magnet holding portion 58.

Figure 4B:
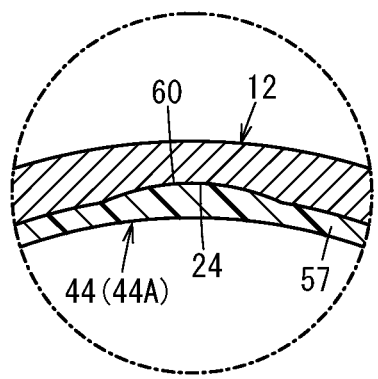
FIG. 4B is a cross-sectional view illustrating a structure (with an arc shape) restricting the rotation of the movable member relative to the cylinder tube.

The detent groove 24 is not necessarily tapered, and may be arc-shaped in section as illustrated in FIG. 4B. In this case, the detent protrusion 60 provided for the movable member 44 has an arc shape similar to the shape of the detent groove 24. In the case where the detent groove 24 has an arc shape, the projection 56 (see FIG. 3) need not necessarily be provided for the packing 42. The sealing performance can also be maintained in this case since the outer circumferential part of the packing 42 elastically deforms along the arc shape of the detent groove 24.

As illustrated in FIG. 3, the magnet 46 has a non-ring shape (point shape or point-like) existing in the piston body 40 only at a point in the circumferential direction, and is fitted in the corresponding magnet holding portion 58 (magnet receiving groove 58a). In the first embodiment, the magnet 46 is fitted in only one of the plurality of magnet holding portions 58. The magnet 46 is, for example, a ferrite magnet, a rare earth magnet, or the like.

As illustrated in FIG. 2, a magnetic sensor 64 is attached to the outside of the cylinder tube 12. Specifically, a sensor bracket 66 is attached to the corresponding connecting rod 32 (see FIG. 1). The magnetic sensor 64 is held by the sensor bracket 66. Thus, the magnetic sensor 64 is secured in place with respect to the head cover 16 and the rod cover 14 via the sensor bracket 66 and the connecting rod 32. The magnetic sensor 64 detects magnetism generated by the magnet 46 to detect the working position of the piston unit 18.

The piston rod 20 is a columnar (circular cylindrical) member extending in the axial direction of the slide hole 13. The piston rod 20 passes through the rod cover 14. A leading end 20b of the piston rod 20 is exposed to the outside of the slide hole 13. A first cushion ring 69a is secured to an outer circumferential part of the piston rod 20 at a position on a side of the piston body 40 adjacent to the rod cover 14. A second cushion ring 69b is secured to the piston body 40 on a side of the piston body 40 opposite to the side on which the first cushion ring 69a lies, to be coaxial with the piston rod 20.

The first cushion packing 68a, the second cushion packing 68b, the first cushion ring 69a, and the second cushion ring 69b constitute an air cushion mechanism reducing the impact at stroke ends. Instead of or in addition to such an air cushion mechanism, dampers composed of an elastic material such as rubber may be attached to, for example, an inner wall surface 14a of the rod cover 14 and an inner wall surface 16a of the head cover 16.

The fluid pressure cylinder 10 configured as above operates as follows. In the description below, air (compressed air) is used as pressurized fluid. However, gas other than air may be used.

In FIG. 2, in the fluid pressure cylinder 10, the piston unit 18 is moved inside the slide hole 13 in the axial directions by the effect of the air serving as the pressurized fluid introduced via the first port 15a or the second port 15b. This causes the piston rod 20 connected with the piston unit 18 to move back and forth.

Specifically, to displace (advance) the piston unit 18 toward the rod cover 14, pressurized fluid is supplied from a pressurized fluid supply source (not illustrated) to the second pressure chamber 13b via the second port 15b while the first port 15a is exposed to the atmosphere. This causes the pressurized fluid to push the piston unit 18 toward the rod cover 14. Thus, the piston unit 18 is displaced (advanced) toward the rod cover 14 together with the piston rod 20.

When the piston unit 18 comes into contact with the rod cover 14, the advancing motion of the piston unit 18 stops. When the piston unit 18 approaches the advanced position, the first cushion ring 69a comes into contact with the inner circumferential surface of the first cushion packing 68a. This creates an airtight seal at the contact part and thus creates an air cushion in the first pressure chamber 13a. As a result, the displacement of the piston unit 18 in the vicinity of the stroke end adjacent to the rod cover 14 is decelerated, and the impact occurring when the piston unit 18 reaches the stroke end is reduced.

On the other hand, to displace (return) the piston body 40 toward the head cover 16, pressurized fluid is supplied from the pressurized fluid supply source (not illustrated) to the first pressure chamber 13a via the first port 15a while the second port 15b is exposed to the atmosphere. This causes the pressurized fluid to push the piston body 40 toward the head cover 16. Thus, the piston unit 18 is displaced toward the head cover 16.

When the piston unit 18 comes into contact with the head cover 16, the returning motion of the piston unit 18 stops. When the piston unit 18 approaches the returned position, the second cushion ring 69b comes into contact with the inner circumferential surface of the second cushion packing 68b. This creates an airtight seal at the contact part and thus creates an air cushion in the second pressure chamber 13b. As a result, the displacement of the piston unit 18 in the vicinity of the stroke end adjacent to the head cover 16 is decelerated, and the impact occurring when the piston unit 18 reaches the stroke end is reduced.

In this case, the fluid pressure cylinder 10 according to the first embodiment produces the following advantageous effects.

According to the fluid pressure cylinder 10, the magnet 46 is disposed only at the required point in the circumferential direction. Thus, the cost and the weight of the product can be reduced. Moreover, when the cylinder tube 12 is rotated with respect to the rod cover 14 and the head cover 16, the magnet 46 held by the movable member 44 disposed inside the cylinder tube 12 also rotates in an integrated manner.

Thus, the magnetic force exerted on the magnetic sensor 64 can be easily adjusted by adjusting the distance between the magnetic sensor 64 disposed outside the cylinder tube 12 and the magnet 46 (positional relationship between the magnetic sensor 64 and the magnet 46 in the circumferential direction). Consequently, the fluid pressure cylinder 10 can support various types of magnetic sensors 64 with different sensitivities without changing the cylinder structure. This efficient use of parts leads to a reduction in the product cost.

The movable member 44 is the wear ring 44A configured to prevent the piston body 40 from coming into contact with the cylinder tube 12. According to the structure, the movable member 44 serves both as a member holding the magnet 46 and the wear ring 44A. This efficient use of parts leads to a further reduction in the product cost.

The annular magnet arrangement groove 52 is formed in the outer circumferential part of the piston body 40. The magnet holding portions 58 are fitted in the magnet arrangement groove 52. In a case where the attachment position of the magnetic sensor 64 in the fluid pressure cylinder 10 cannot be determined in advance, a ring-shaped magnet will be used. According to the above-described structure, the piston body 40 can be used for both the fluid pressure cylinder 10 (present invention) with the non-ring-shaped magnet 46 and for a fluid pressure cylinder with a ring-shaped magnet. This efficient use of parts leads to a reduction in the product cost.

The detent groove 24 extends in the inner circumferential surface of the cylinder tube 12 in the axial direction of the cylinder tube 12. The movable member 44 is provided with the detent protrusion 60 fitted in the detent groove 24. This simple structure allows the rotation of the movable member 44 and the cylinder tube 12 relative to each other to be restricted.

In the case where the detent groove 24 and the detent protrusion 60 have a polygonal shape as illustrated in FIG. 4A, the rotation of the movable member 44 and the cylinder tube 12 relative to each other can be restricted in a preferred manner.

In the case where the detent groove 24 and the detent protrusion 60 have an arc shape as illustrated in FIG. 4B, the packing 42 readily provides a desired sealing performance. Moreover, in this case, the packing 42 does not require the projection 56, and a similar typical packing can be used. This allows simplification of the structure and provides increased economy.

As illustrated in FIG. 3, the movable member 44 includes the circumferential portion 57 extending in the circumferential direction along the outer circumferential part of the piston body 40, and the magnet holding portions 58 protrude from the circumferential portion 57 in the axial direction. In addition, the detent protrusion 60 extends across the outer surface 57b of the circumferential portion 57 and the outer surface 58e of the magnet holding portions 58. According to the structure, the axial length of the detent protrusion 60 required to restrict the rotation of the movable member 44 and the cylinder tube 12 relative to each other in a preferred manner can be easily obtained.

The projection 56 inserted into the detent groove 24 to be in slidably contact with the inner surface of the detent groove 24 is disposed on the outer circumferential part of the packing 42. According to the structure, sealing performance at the area of the detent groove 24 (airtightness or liquid-tightness between the first pressure chamber 13a and the second pressure chamber 13b) can be satisfactorily enhanced.

The magnet holding portions 58 each have the magnet receiving groove 58a in which the magnet 46 can be fitted. Each of the magnet receiving grooves 58a passes through the corresponding magnet holding portion 58 in the axial direction and is open radially inward. According to the structure, the magnet 46 can be easily attached to one of the magnet holding portions 58 during assembly.

Figure 5:
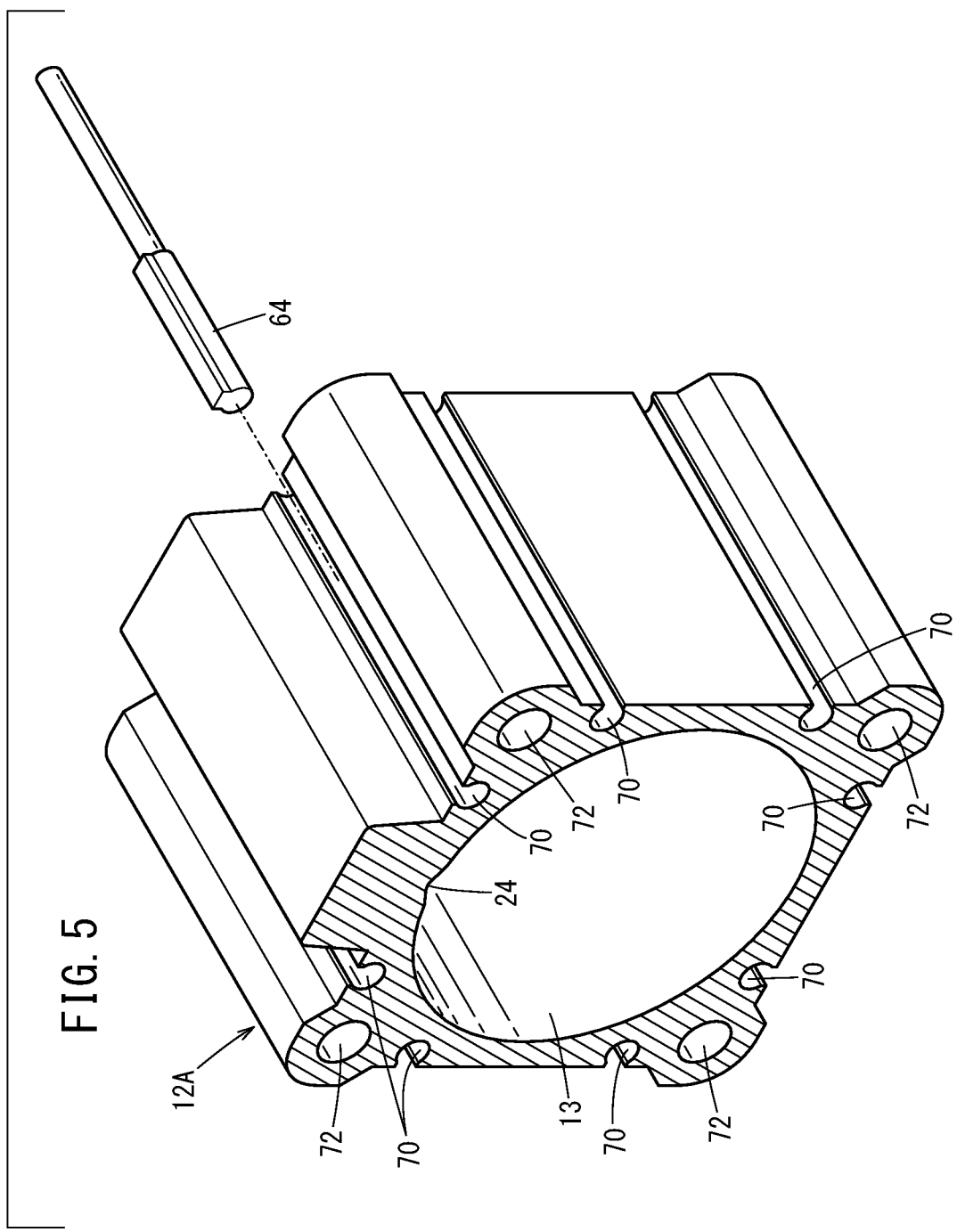
FIG. 5 is a perspective view of a cylinder tube according to another structure.

In the above-described fluid pressure cylinder 10, a cylinder tube 12A illustrated in FIG. 5 may be used instead of the cylinder tube 12. The cylinder tube 12A has an approximately quadrangular outer shape. A plurality of sensor receiving grooves 70 extending in the axial direction are formed in an outer circumferential part of the cylinder tube 12A. Specifically, the outer circumferential part of the cylinder tube 12A is composed of four faces, and two sensor receiving grooves 70, eight in total, are formed in each face. Thus, the magnetic sensor 64 is attached to the cylinder tube 12A at a fixed position outside the cylinder tube 12A. The detent groove 24 is provided in the inner circumferential surface of the cylinder tube 12A.

Rod insertion holes 72 are created in the corners of the quadrangular cylinder tube 12A. The connecting rods 32 are inserted into the rod insertion holes 72. Thus, in the case where the cylinder tube 12A is used in the fluid pressure cylinder 10, the circumferential position of the cylinder tube 12A cannot be adjusted (the cylinder tube 12A does not rotate even when the connecting rods 32 are loosened).

In the fluid pressure cylinder 10 using the cylinder tube 12A, the distance between the magnetic sensor 64 and the magnet 46 is unchanged even when the piston rod 20 is rotated. This conveniently allows the piston rod 20 to be rotated without changing the distance between the magnetic sensor 64 and the magnet 46 when, for example, the fluid pressure cylinder 10 is installed in equipment.

Figure 6:
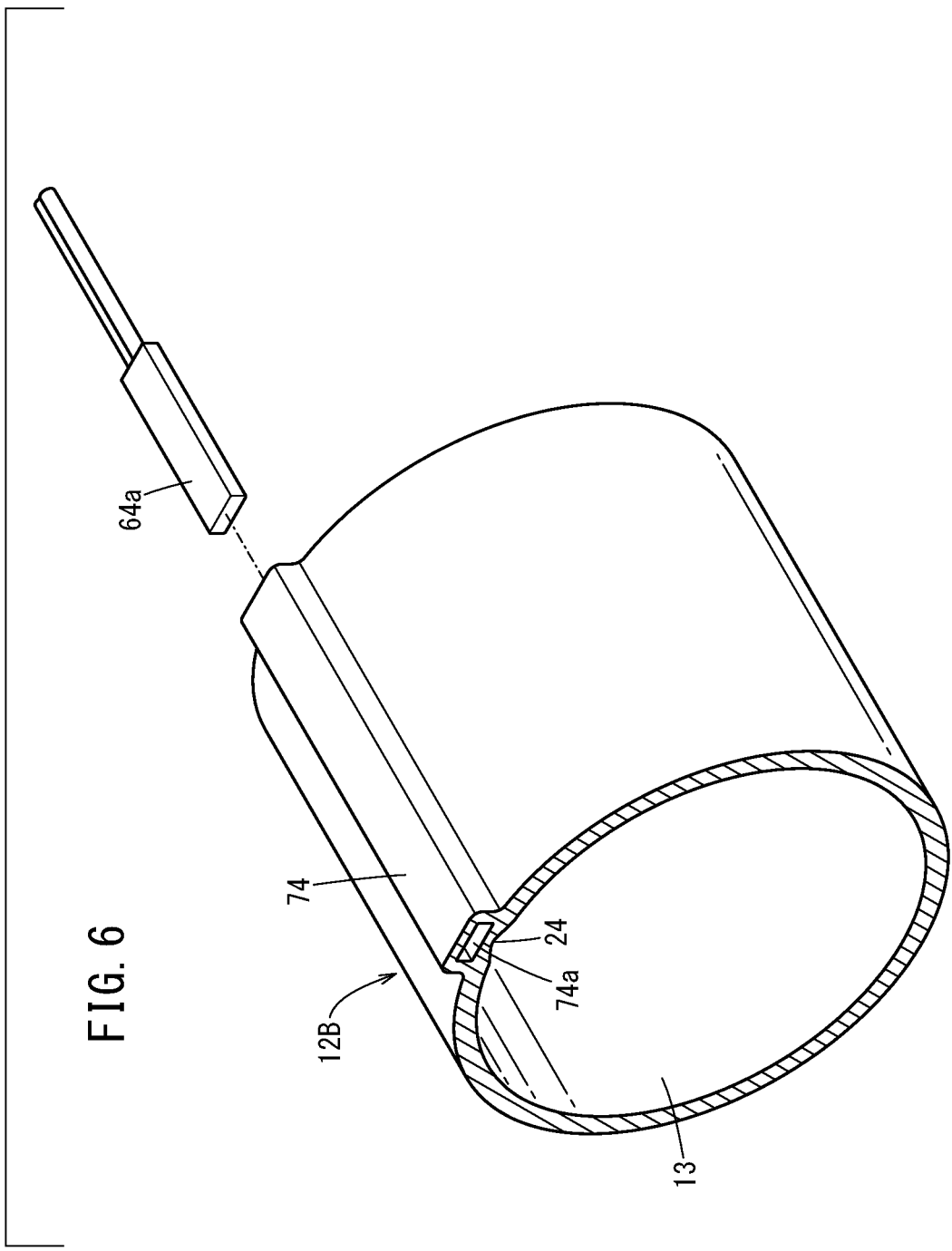
FIG. 6 is a perspective view of a cylinder tube according to yet another structure.

In the above-described fluid pressure cylinder 10, a cylinder tube 12B illustrated in FIG. 6 may be used instead of the cylinder tube 12. The cylinder tube 12B is provided with a protrusion 74 extending in the axial direction at a portion of an outer circumferential part of the cylinder tube 12B. A magnetic sensor receiving slot 74a is provided inside the protrusion 74. A flat, thin (low-profile) magnetic sensor 64a is inserted into the magnetic sensor receiving slot 74a. The detent groove 24 is provided in the inner circumferential surface of the cylinder tube 12B.

In the fluid pressure cylinder 10 using the cylinder tube 12B, the distance between the magnetic sensor 64a and the magnet 46 is unchanged even when the piston rod 20 is rotated. This conveniently allows the piston rod 20 to be rotated without changing the distance between the magnetic sensor 64a and the magnet 46 when, for example, the fluid pressure cylinder 10 is installed in equipment.

Figure 7:
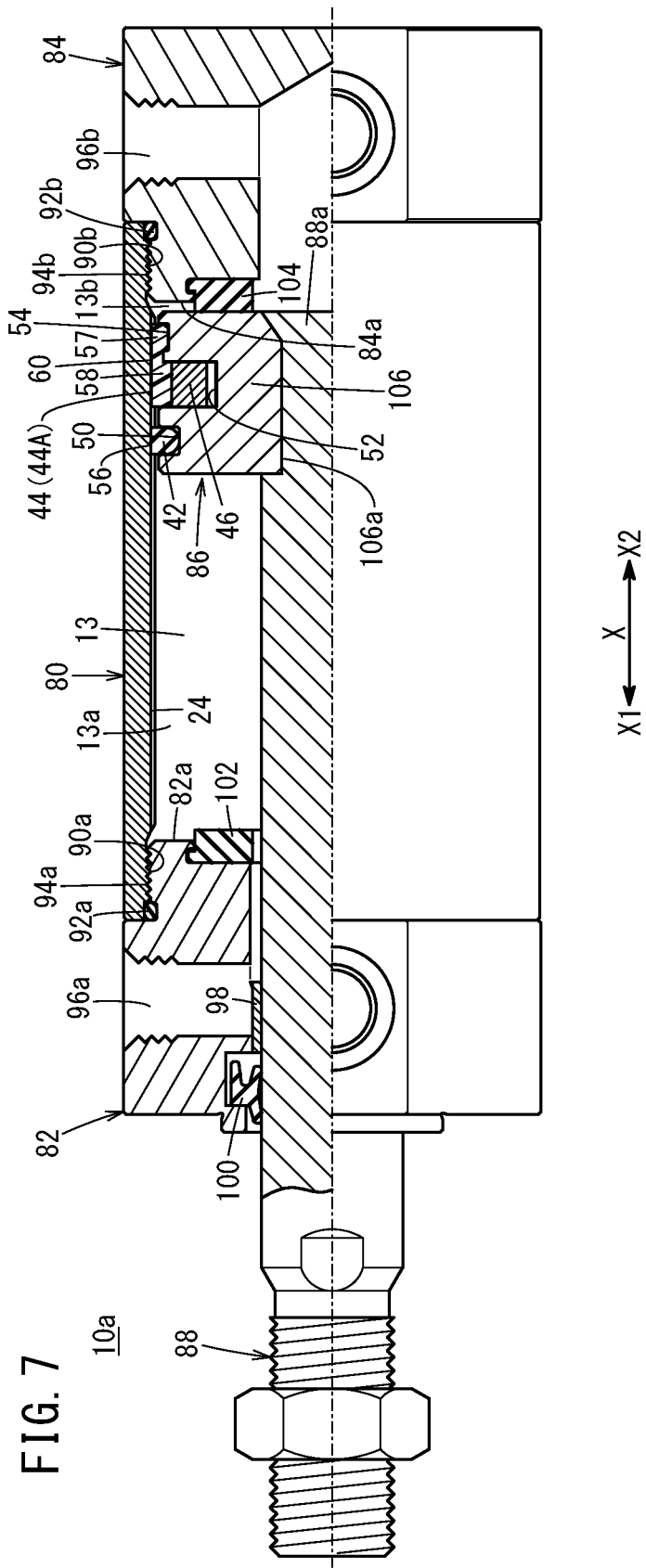
FIG. 7 is a partially sectioned side view of a fluid pressure cylinder according to a second embodiment of the present invention.

A fluid pressure cylinder 10a according to a second embodiment illustrated in FIG. 7 includes a hollow tubular cylinder tube 80 having a circular slide hole 13 inside the cylinder tube 80, a rod cover 82 disposed at one end part of the cylinder tube 80, a head cover 84 disposed at another end part of the cylinder tube 80, a piston unit 86 disposed inside the cylinder tube 80 to be movable in the axial directions (X directions), and a piston rod 88 connected with the piston unit 86.

The cylinder tube 80 has a hollow cylindrical shape. Internal thread portions 90a and 90b are formed on the inner circumferential surface of the cylinder tube 80 at either end part. A detent groove 24 extends in the inner circumferential surface of the cylinder tube 80 in the axial direction of the cylinder tube 80. Packings 92a and 92b with a circular ring shape are respectively disposed between the cylinder tube 80 and the rod cover 82, and between the cylinder tube 80 and the head cover 84.

Although not illustrated, a magnetic sensor 64 (see FIG. 1, for example) is attached to the outer circumferential surface of the cylinder tube 80 at a freely selected position using a sensor mounting band. The sensor mounting band includes a sensor holder holding the magnetic sensor 64 and a band portion securing the sensor holder to an outer circumferential part of the cylinder tube 80. Since the magnetic sensor 64 can be disposed at a freely selected position on the outer circumferential part of the cylinder tube 80, the magnetic sensor 64 can be attached after the distance between the magnetic sensor 64 and a magnet 46 (positional relationship in the circumferential direction) is adjusted.

An external thread portion 94a formed on the rod cover 82 engages with the internal thread portion 90a formed on the inner circumferential surface of the cylinder tube 80 adjacent to the one end part. The rod cover 82 has a first port 96a. A bush 98 with a circular ring shape and a packing 100 with a circular ring shape are disposed in an inner circumferential part of the rod cover 82.

A damper 102 composed of an elastic material is attached to an inner wall surface 82a of the rod cover 82. An external thread portion 94b formed on the head cover 84 engages with the internal thread portion 90b formed on the inner circumferential surface of the cylinder tube 80 adjacent to the other end part. The head cover 84 has a second port 96b. A damper 104 composed of an elastic material is attached to an inner wall surface 84a of the head cover 84.

The piston unit 86 includes a circular piston body 106 protruding radially outward from the piston rod 88, a packing 42 attached to an outer circumferential part of the piston body 106, a movable member 44 attached to the outer circumferential part of the piston body 106 to be rotatable relative to the piston body 106, and the magnet 46 disposed in the piston body 106 partially in the circumferential direction of the piston body 106.

A base end portion 88a (small diameter portion) of the piston rod 88 is inserted into a through-hole 106a created in the piston body 106 and secured to the piston body 106 by swaging. The piston body 106 and the piston rod 88 may be secured to each other by screwing instead of swaging.

In accordance with the fluid pressure cylinder 10a according to the second embodiment, the distance between the magnetic sensor 64 and the magnet 46 is unchanged even when the piston rod 88 is rotated after the magnetic sensor 64 is attached to the outer circumferential part of the cylinder tube 80 (after the distance between the magnetic sensor 64 and the magnet 46 in the circumferential direction is set). This conveniently allows the piston rod 88 to be rotated without changing the distance between the magnetic sensor 64 and the magnet 46 when, for example, the fluid pressure cylinder 10a is installed in equipment.

Components of the second embodiment common to those of the first embodiment produce operation and advantageous effects identical or similar to those of the first embodiment.

The present invention is not limited in particular to the embodiments described above, and various modifications can be made thereto without departing from the scope of the present invention.

The invention claimed is:

1. A fluid pressure cylinder comprising:
a cylinder tube including a slide hole with a circular shape inside the cylinder tube;
a piston unit disposed to be reciprocable along the slide hole; and
a piston rod protruding from the piston unit in an axial direction;
wherein the piston unit includes:
a piston body with a circular shape protruding radially outward from the piston rod;
a packing attached to an outer circumferential part of the piston body and brought into slidable contact with an inner circumferential surface of the cylinder tube;
a movable member including a magnet holding portion and mounted at the outer circumferential part of the piston body to be rotatable relative to the piston body; and
a magnet held by the magnet holding portion and disposed in the piston body at a discrete location which is less than an entirety of a circumferential extent of the piston body, wherein:
the piston rod is rotatable relative to the cylinder tube; and
rotation of the movable member relative to the cylinder tube is restricted,
a magnet arrangement groove with an annular shape is formed in the outer circumferential part of the piston body; and
the magnet holding portion is fitted in the magnet arrangement groove.

2. A fluid pressure cylinder comprising:
a cylinder tube including a slide hole with a circular shape inside the cylinder tube;
a piston unit disposed to be reciprocable along the slide hole; and
a piston rod protruding from the piston unit its an axial direction;
wherein the piston unit includes:
a piston body with a circular shape protruding radially outward from the piston rod;
a packing attached to an outer circumferential part of the piston body and brought into slidable contact with an inner circumferential surface of the cylinder tube;
a movable member including a magnet holding portion and mounted at the outer circumferential part of the piston body to be rotatable relative to the piston body; and
a magnet held by the magnet holding portion and disposed in the piston body at a discrete location which is less than an entirety of a circumferential extent of the piston body, wherein:
the piston rod is rotatable relative to the cylinder tube; and
rotation of the movable member relative to the cylinder tube is restricted,
a detent groove is provided in the inner circumferential surface of the cylinder tube in an axial direction of the cylinder tube; and
the movable member is provided with a detent protrusion fitted in the detent groove.

3. The fluid pressure cylinder according to claim 2, wherein:
the movable member includes a circumferential portion extending in the circumferential direction along the outer circumferential part of the piston body;
the magnet holding portion protrudes from the circumferential portion in the axial direction; and
the detent protrusion is provided across an outer surface of the circumferential portion and an outer surface of the magnet holding portion.

4. The fluid pressure cylinder according to claim 2, wherein a projection inserted in the decent groove to be in slidable contact with an inner surface of the detent groove is disposed on an outer circumferential part of the packing.

5. The fluid pressure cylinder according to claim 3, wherein:
   the magnet holding portion has a magnet receiving groove in which the magnet is fitted; and
   the magnet receiving groove passes through the magnet holding portion in the axial direction and is open radially inward.

* * * * *